United States Patent
Jeng et al.

(10) Patent No.: US 7,843,430 B2
(45) Date of Patent: *Nov. 30, 2010

(54) INERTIAL INPUT APPARATUS WITH SIX-AXIAL DETECTION ABILITY AND THE OPERATING METHOD THEREOF

(75) Inventors: Sheng-Wen Jeng, Tainan (TW); Shun-Nan Liou, Kaohsiung (TW); Shih-Ching Huang, Kaohsiung County (TW); Ming-Jye Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 795 days.

This patent is subject to a terminal disclaimer.

(21) Appl. No.: 11/675,104

(22) Filed: Feb. 15, 2007

(65) Prior Publication Data

US 2008/0134784 A1    Jun. 12, 2008

(30) Foreign Application Priority Data

Dec. 12, 2006   (TW) .............................. 95146526 A

(51) Int. Cl.
G09G 5/00   (2006.01)

(52) U.S. Cl. ....................... 345/158; 345/156; 345/163

(58) Field of Classification Search .......... 345/156–172
See application file for complete search history.

(56) References Cited

U.S. PATENT DOCUMENTS 4,787,051 A    11/1988  Olson
5,181,181 A *  1/1993  Glynn .......................... 702/141
5,627,565 A *  5/1997  Morishita et al. ........... 345/158
5,781,172 A    7/1998  Engel et al.
5,825,350 A    10/1998 Case, Jr. et al.
5,898,421 A    4/1999  Quinn
2004/0104891 A1  6/2004  Sacca et al.
2008/0134783 A1*  6/2008  Jeng et al. ................. 73/514.01
2008/0134784 A1*  6/2008  Jeng et al. ................. 73/514.01

FOREIGN PATENT DOCUMENTS

| EP | 0457541 | 11/1991 |
| JP | 6007371 | 1/1994 |
| TW | 526975 | 4/2003 |
| TW | 594553 | 6/2004 |

* cited by examiner

Primary Examiner—Vijay Shankar
(74) Attorney, Agent, or Firm—WPAT, PC; Justin King

(57) ABSTRACT

An inertial input apparatus with six-axial detection ability, structured with a gyroscope and an acceleration module capable of detecting accelerations of X, Y, Z axes defined by a 3-D Cartesian coordinates, which is operable either being held to move on a planar surface or in a free space. When the inertial input apparatus is being held to move and operate on a planar surface by a user, a two-dimensional detection mode is adopted thereby that the gyroscope is used for detection rotations of the inertial input apparatus caused by unconscious rolling motions of the user and thus compensating the erroneous rotations, by which the technical disadvantages of prior-art inertial input apparatuses equipped with only accelerometer can be overcame and thus control smoothness of using the input apparatus is enhanced.

19 Claims, 6 Drawing Sheets

50

51 — recording two accelerations ($g_{xs}$, $g_{ys}$) measured along two non-parallel directions with respect to a Cartesian coordinate system of X-, and Y-axes at an initial operating stage of the inertial input apparatus along with an initial angular velocity $\omega_{zs}$ of a gyroscopic element while setting an initial angle $\theta_p$ of the inertial input apparatus to be zero 52 — calculating a yawing angle $\theta_z$ with respect to a Z-axis of the Cartesian coordinate system and a pitch angle $\theta_y$ with respect to the Y-axis 53 — using the two angles ($\theta_z$, $\theta_y$) to define a position coordinate ($M_x$, $M_y$) for an object displayed on a screen of an interactive computer 54 — page change detection

FIG.5

INERTIAL INPUT APPARATUS WITH SIX-AXIAL DETECTION ABILITY AND THE OPERATING METHOD THEREOF

FIELD OF THE INVENTION

The present invention relates to an inertial input apparatus with six-axial detection ability and the operating method thereof, and more particularly, to an inertial input apparatus configured with accelerometers and gyroscope, capable of adapting itself to be operative no matter the inertial input apparatus is being held to operate on a planar surface or in a free space.

BACKGROUND OF THE INVENTION

There are already several cursor-control devices integrating functions of the computer mouse and the presentation device. However, the control methods adopted thereby are still similar to those conventional computer mice and thus suffering the same limitations. As for the inertial/gravity mouse which are being aggressively studied, it is still troubled by many technical difficulties and thus remains to be improved.

There are many researches relating to inertial mouse. One of which is an input device disclosed in U.S. Pat. No. 5,898,421, entitled "Gyroscopic Pointer and Method", as seen in FIG. 1. The hand-held input device, having an inertial gyroscope 110 arranged therein, is capable of being used in free space, employing the inertial gyroscope 110 for detecting angular velocity of a user's hand and thus, by the signal transmission of the interface 180, defining movements of a cursor displayed on a screen of an interactive computer. In one embodiment of the aforesaid patent as that shown in FIG. 1, the inertial gyroscope 110, arranged inside the hand-held input device, is driven to rotate by power provided from a wall adapter 190 and is pivotally coupled to an inner frame 170 by a pair of coaxial gimbals 115, 120 while pivotally coupling to an outer frame 160 by another pair of coaxial gimbals 140, 145 whose axis is perpendicular to that of the gimbals 115, 120. As there is only a gyroscope 110 configured in the hand-held input device, it is only suitable to be used in a free space and is not able to operate on a planar surface. Moreover, it is conceivable that the referring mouse is comparably bulky and suffers a high margin of error as gyroscope 110 is mechanically coupled inside the hand-held input device.

Please refer to FIG. 2, which shows a pointing device disclosed in U.S. Pat. No. 5,825,350, entitled "Electronic Pointing Apparatus and Method". The foregoing pointing apparatus 100 is capable of controlling cursor movement and selecting elements on a computer screen no matter it is being held to move on a planar surface or in a free space, in which two gyroscopes, respectively coupled to a gyroscope printed circuit board 452, are provided for indicating yaw and pitch movements of the pointing apparatus in free space, and a mouse ball 260 and relating mouse ball encoders are provided for indicating movement of the pointing device on a planar surface. The switching of the pointing apparatus 100 between a two-dimensional mode and a three-dimensional mode is enabled by a ball locking mechanism, which is comprised of a lever 472 and a plunger 270, connected to the lever 472. That is, when the pointing apparatus 100 is being held to move on a planar surface, the plunger 270 that extends out of an opening of the housing is pushed through the opening to a position substantially level with the surface of the bottom side and thus lifts the lever 472 for freeing the mouse ball 260, so that the pointing apparatus 100 is being enabled to operate in the two-dimensional mode, and when the pointing apparatus 100 is being lift and move in a free space, the plunger 270 will drop and thus pull the lever 472 to press down while enabling the elevated region 506 to press upon the mouse ball 260 for holding the same from rolling freely, so that the pointing apparatus 100 is being enabled to operate in the three-dimensional mode. Although the aforesaid pointing apparatus is operable no matter it is being held to move on a planar surface or in a free space, it is still not preferred, since when the pointing apparatus 100 is being lift and move in a free space, it is more than likely that the cooperative effort of the lever 472 and its elevated region 506 can not precisely hold the mouse ball 260 still that the mouse ball 260 is intended to roll or move unexpected and causes the pointing apparatus 100 to generate unwanted signals interfering the cursor movement on the screen.

There are some consumer products, similar to the pointing apparatus shown in FIG. 2, currently available on the market that each can be considered as a standard LED optical mouse with addition gyroscope arranged therein and is different from that of FIG. 2 by replacing the mouse ball 260 with an optical module and thus the problem caused by the unexpected rolling of the mouse ball is prevented. However, such optical gyroscope mouse is just a housing accommodating two separated and independent modules, one acting as a common LED optical mouse while sitting on a planar surface, and another acting as gyroscope to detect the angular velocity of rotation while operating in free space, that the circuit of the LED optical module has no relation with the gyroscopic circuit. Therefore, not only such optical gyroscope mouse can not benefit from the design since it can only provide basic functions the same as the addition of a standard LED optical mouse and a gyroscope, but also it is a heavy, bulky and complicated device.

Please refer to FIG. 3, which is gravity mouse disclosed in TW Pat. Appl. No. 90221010. As the gravity mouse is being held to move and used for controlling the movement of a cursor displayed on a monitor of a personal computer (PC), its gravity sensor (i.e. G sensor) with potential energy measuring ability is enable to detect the potential energy variation of the gravity mouse caused by a movement of the same while transmitting a signal generated accordingly to its micro process unit (MCU) to be processed. As the MCU is able to detect the duration of the movement while receiving an acceleration caused by the movement, it can generate a control signal for controlling the cursor to move accordingly with respect to the duration and the acceleration. It is known that the movement of the cursor is determined by a integration operation performed based upon the detections of at least two accelerometers configuring in the gravity mouse at two perpendicular axes. Thus, as the movement is defined by integration which is prone to accumulate error, the positioning of the cursor might not be accurate.

Therefore, it is in need of an inertial sensing input apparatus that is accurate and convenience to operate no matter it is being held to move on a surface or in a free space, by which not only the unconscious rotation caused by a human operation as it is being held in a human hand is compensated, but also the interferences caused by the electronic noises generated from the accelerometer can be prevented for freeing the inertial sensing input apparatus of the invention from the shortcomings of prior-art inertial input apparatus using only accelerometers.

SUMMARY OF THE INVENTION

In view of the disadvantages of prior art, the primary object of the present invention is to provide an inertial input apparatus with six-axial detection ability, structured with a gyroscope and an acceleration module capable of detecting accelerations of X, Y, Z axes defined by a 3-D Cartesian coordinates, which is operable either being held to move on a planar surface or in a free space. When the inertial input apparatus is being held to move and operate on a planar surface by a user, a two-dimensional detection mode is adopted thereby that the gyroscope is used for detection rotation of the inertial input apparatus caused by unconscious rolling motions of the user and thus compensating the erroneous rotations, by which the technical disadvantages of prior-art inertial input apparatuses equipped with only accelerometer can be overcame and thus control smoothness of using the input apparatus is enhanced. In addition, when the inertial input apparatus is being held to operate in a free space by a user, a three-dimensional detection mode is adopted for enabling the inertial input apparatus to detect movements of the same with respect to at most six axes defined by the 3-D Cartesian coordinates of X, Y, Z axes, that is, the rotations with respect to the X, Y, Z axes and the movements with respect to the X, Y, Z axes, and thus the inertial input apparatus is adapted to be used as an input device for interactive computer games, In a preferred aspect, when the inertial input apparatus is acting as a 3-D mouse suitable to be used for briefing or in a remote control environment, only the detections with respect to the X and Y axes acquired by the accelerometer along with that of the gyroscope are adopts and used as control signals for controlling cursor displayed on a screen, but the detection with respect to the Z and axis acquired by the accelerometer is used as a switch signal for directing the inertial input apparatus to switch between its two-dimensional detection mode and three-dimensional detection mode.

To achieve the above object, the present invention provides an inertial input apparatus with six-axial detection ability, comprising:

an accelerometer module, structured with at least three accelerometers for detecting accelerations in three perpendicular directions with respect to a Cartesian coordinate system of X-, Y-, and Z-axes; and a gyroscope, used for detecting a rotation measured with respect to the Z-axis;

wherein, an angle of rotation is obtained by integrating the angular velocity of the rotation detected by the gyroscope while calculating a centrifugal force as well as a centripetal force exerting upon the inertial input apparatus at the moment of the rotation so as to using those for compensating acceleration signals measured along the Y-axis and thus obtaining a pitch angle basing on the compensated Y-axis acceleration signal, thereafter defining movements of an object displayed on a screen of an interactive computer by the use of the pitch angle and the angle of rotation.

Preferably, one accelerometer of the acceleration module, referring hereinafter as an X-axis accelerometer, is being enabled for detecting an acceleration generated by a rolling of the inertial input apparatus about the Y-axis while referring hereinafter such acceleration as X-axis acceleration; another accelerometer of the acceleration module, referring hereinafter as a Y-axis accelerometer, is being enabled for detecting an acceleration generated by a pitching of the inertial input apparatus about the X-axis while referring hereinafter such acceleration as Y-axis acceleration; one another accelerometer of the acceleration module, referring hereinafter as an Z-axis accelerometer, is being enabled for detecting an acceleration with respect to the Z-axis while the inertial sensing input apparatus is experiencing an up-and-down displacement; and the gyroscope is used for detecting and measuring a rotation about the Z-axis.

To achieve the above object, the present invention further provide an operating method for an inertial input apparatus with six-axial detection ability being held to move in a free space, comprising the steps of:

recording two accelerations ($g_{xs}$, $g_{ys}$) measured along two perpendicular directions with respect to a Cartesian coordinate system of X-, and Y-axes at an initial operating stage of the inertial input apparatus along with an initial angular velocity $\omega_{zs}$ of a gyroscope while setting an initial angle $\theta_p$ of the inertial input apparatus to be zero;

calculating a yawing angle $\theta_z$ with respect to a Z-axis of the Cartesian coordinate system and a pitch angle $\theta_y$ with respect to the Y-axis; and using the two angles ($\theta_z$, $\theta_y$) to define a position coordinate ($M_x$, $M_y$) for an object displayed on a screen of an interactive computer.

Preferably, the calculating of the yawing angle $\theta_z$ and the pitch angle $\theta_y$ further comprises the steps of:

calculating the yawing angle $\theta_z$ with respect to the Z-axis by the following formulas:

$\theta_z = \theta_p + (\omega_z - \omega_{zs}) \times \Delta t$, while $|\omega_z - \omega_{zs}|$ is larger than a threshold value, wherein $\Delta t$ is the sampling interval, preferably every 10 mini-sec, the threshold value is preferably being set to be 0.1 (degree/sec) so as to eliminate noise correspondingly, and then let $\theta_p = \theta_z$;

compensating a Y-axis acceleration detected by a Y-axis accelerometer of an acceleration module by subtracting a centripetal force $g_r$ from an actual acceleration $g_a$ detected by the Y-axis accelerometer, as illustrated in the following formulas:

$g_a = g_r + g_s$;

$g_r = R \times (\omega_z - \omega_{zs})^2$;

$g_y = g_a - g_r$;

wherein R is the distance between a rotation center and the accelerometer;

$g_s$ is acceleration caused by other electrical noises;

$g_y$ is the compensated Y-axis acceleration;

calculating the pitch angle $\theta_y$ with respect to the Y-axis using the compensated Y-axis acceleration $g_y$ by the following formulas:

$$\theta_y = \sin^{-1}\left(\frac{g_y - g_{ys}}{g_{ys}}\right)$$

Preferably, the two angles ($\theta_z$, $\theta_y$) are amplified by specific ratios in respective so as to be used for defining a position coordinate ($M_x$, $M_y$) for an object displayed on a screen of an interactive computer, according to the following formulas:

$M_s = S_x \times \theta_z$, $M_y = S_y \times \theta_y$;

wherein $S_x$ is the amplifying ratio with respect to the X-axis;

$S_y$ is the amplifying ratio with respect to the Y-axis.

Preferably, the method further comprises a page-change detection step, which use an abrupt change in X-axis acceleration detected by the inertial input apparatus as a page-change signal by comparing the abrupt change with a threshold value. In a preferred aspect, by defining a threshold value thr as 150 count, the page-change detection step is structured as following:

paging up if $(g_x-g_{xs})$>thr; and paging down if $(g_x-g_{xs})$<−thr; or vice versa maintaining without page change if −thr≦$(g_x-g_{xs})$≦thr;

wherein $g_x$ is an X-axis acceleration at the end of an abrupt change occur;

$g_{xs}$ is an X-axis acceleration at the beginning of an abrupt change occur.

It is noted that the threshold value thr can be adjusted at will with respect to any actual requirement.

In another preferred embodiment, the method further comprises another page-change detection step, which uses a rolling angle $\theta_x$ with respect to the X-axis as a page-change signal by comparing the rolling angle $\theta_x$ with a threshold value. In a preferred aspect, by defining the threshold value thr as 30 degree, the page-change detection step is structured as following:

paging up if $\theta_x$>thr; and paging down if $\theta_x$<−thr; or vice versa;

maintaining without page change if −thr≦$\theta_x$≦thr.

In addition, the present invention further provide a method for switching an inertial input apparatus with six-axial detection ability between a two-dimensional detection mode and a three-dimensional detection mode, comprising the steps of:

recording three initial accelerations ($g_{xs}$, $g_{ys}$, $g_{zs}$) measured along three perpendicular directions with respect to a Cartesian coordinate system of X-, Y- and Z-axes respectively by an acceleration module of the inertial input apparatus while the inertial input apparatus is at rest on a surface along with an initial angular velocity $\omega_{zs}$ of a gyroscope and setting an initial angle $\theta_p$ of the inertial input apparatus to be zero and enabling the inertial input apparatus to enter the two-dimensional detection mode;

double-integrating the difference between the initial acceleration $g_{zs}$ and current accelerations detected by a Z-axis accelerometer of the acceleration module for obtaining a mode-change value $S_Z$, i.e. $S_Z=\iint(g_z-g_{zs})$;

comparing $S_Z$ with a threshold value thr;

maintaining the inertial input apparatus at the two-dimensional detection mode when $S_Z$<thr; and enabling the inertial input apparatus to enter the three-dimensional detection mode when $S_Z$>thr.

Preferably, the inertial input apparatus is enabled to enter the three-dimensional detection mode when a plurality of mode-change values $S_Z$ detected within a specific time interval are all larger than the threshold value thr.

Preferably, the inertial input apparatus is enabled to enter the two-dimensional detection mode when the mode-change values $S_Z$ is smaller than the threshold value thr and the absolute differences between the inertial acceleration $g_{ys}$ and a plurality of Y-axis accelerations $g_y$ detected by a Y-axis accelerometer of the acceleration module within a specific time interval, i.e. $|g_y-g_{ys}|$, are all smaller than a specific value or almost equal to zero.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 5 is a flow chart depicting an operating method for an inertial input apparatus with six-axial detection ability being held to move in a free space.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
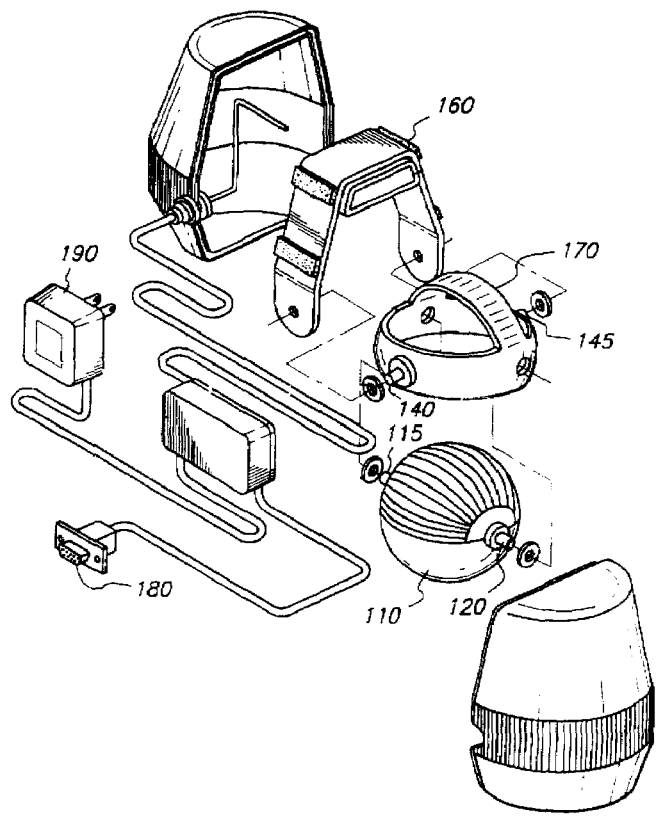
FIG. 1 is an expanded perspective view of an input device, disclosed in U.S. Pat. No. 5,898,421, entitled "Gyroscopic Pointer and Method".
Figure 2:
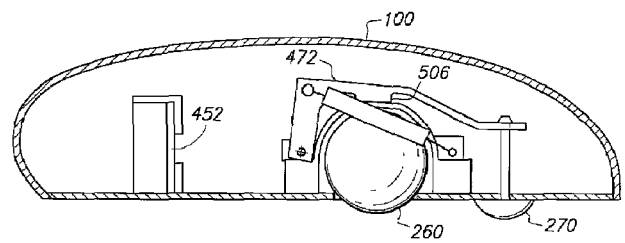
FIG. 2 shows a pointing device disclosed in U.S. Pat. No. 5,825,350, entitled "Electronic Pointing Apparatus and Method".
Figure 3:
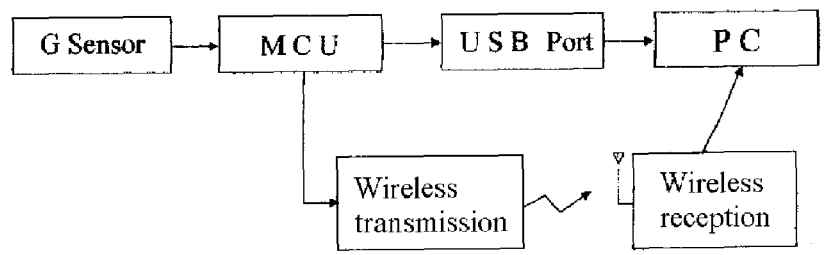
FIG. 3 is gravity mouse disclosed in TW Pat. Appl. No. 90221010.
Figure 4:
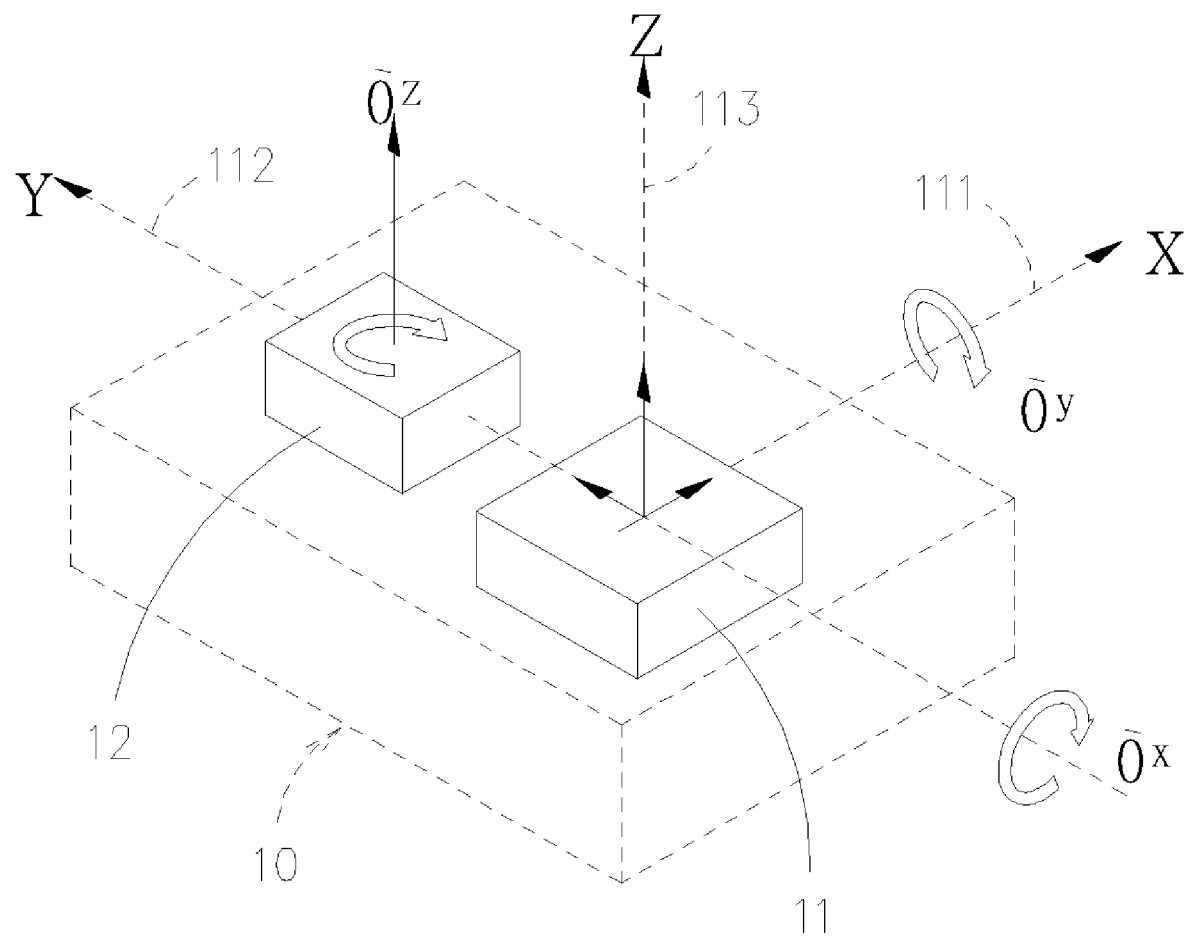
FIG. 4 shows an inertial sensing input apparatus of the invention, being defined in three perpendicular directions with respect to a Cartesian coordinate system of X-, Y-, and Z-axes.

Please refer to FIG. 4, which shows an inertial sensing input apparatus of the invention, being defined in three perpendicular directions with respect to a Cartesian coordinate system of X-, Y-, and Z-axes. The inertial sensing input apparatus with six-axial detection ability 10 is comprised of: an accelerometer module 11, structured with at least three accelerometers for detecting accelerations in three perpendicular directions with respect to a Cartesian coordinate system of X-, Y-, and Z-axes; and a gyroscope 12, used for detecting a rotation measured with respect to the Z-axis; wherein, one accelerometer of the acceleration module 11, referring hereinafter as an Z-axis accelerometer 113, is being enabled for detecting an acceleration with respect to the Z-axis while the inertial input apparatus 10 is experiencing an up-and-down displacement and thus determining whether to enable the same to enter a two-dimension (2D) detection mode or a three-dimension (3D) detection mode. Moreover, when the inertial input apparatus 10 is operating under the three-dimension (3D) detection mode, one accelerometer of the acceleration module, referring hereinafter as an X-axis accelerometer 111, is being enabled for detecting an acceleration generated by a rolling of the inertial input apparatus about the Y-axis to be used for calculating a rolling angle $\theta_x$; another accelerometer of the acceleration module, referring hereinafter as a Y-axis accelerometer 112, is being enabled for detecting an acceleration generated by a pitching of the inertial input apparatus about the X-axis to be used for calculating a pitching angle $\theta_y$; and an yawing angle $\theta_z$ is obtained by the processing of angular velocity signals detected by the gyroscope 12. In addition, the X-axis accelerometer 111, the Y-axis accelerometer 112, and the Z-axis accelerometer 113 are capable of detecting and measuring accelerations along the X-axis, the Y-axis and the Z-axis in respective for defining the movements of the inertial input apparatus 10 in the directions of X-, Y-, and Z-axes in respective.

Figure 6:
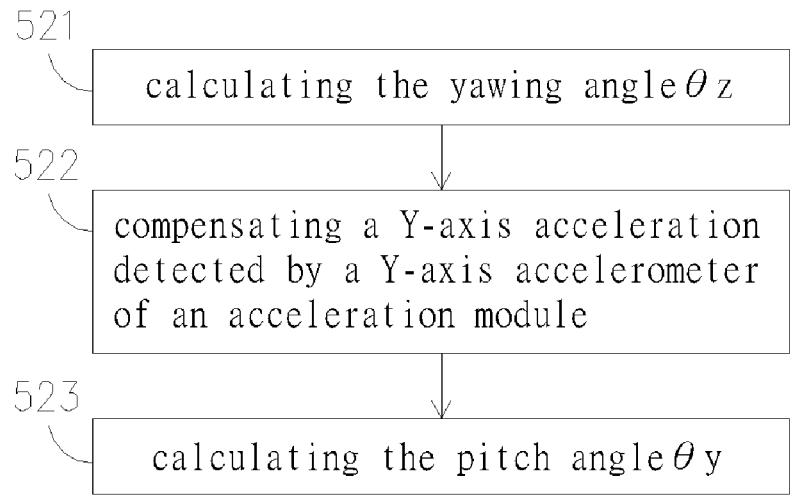
FIG. 6 is a flow chart depicting steps for calculating a yawing angle $\theta_z$ with respect to a Z-axis of the Cartesian coordinate system and a pitch angle $\theta_y$ with respect to the Y-axis.
Figure 8:
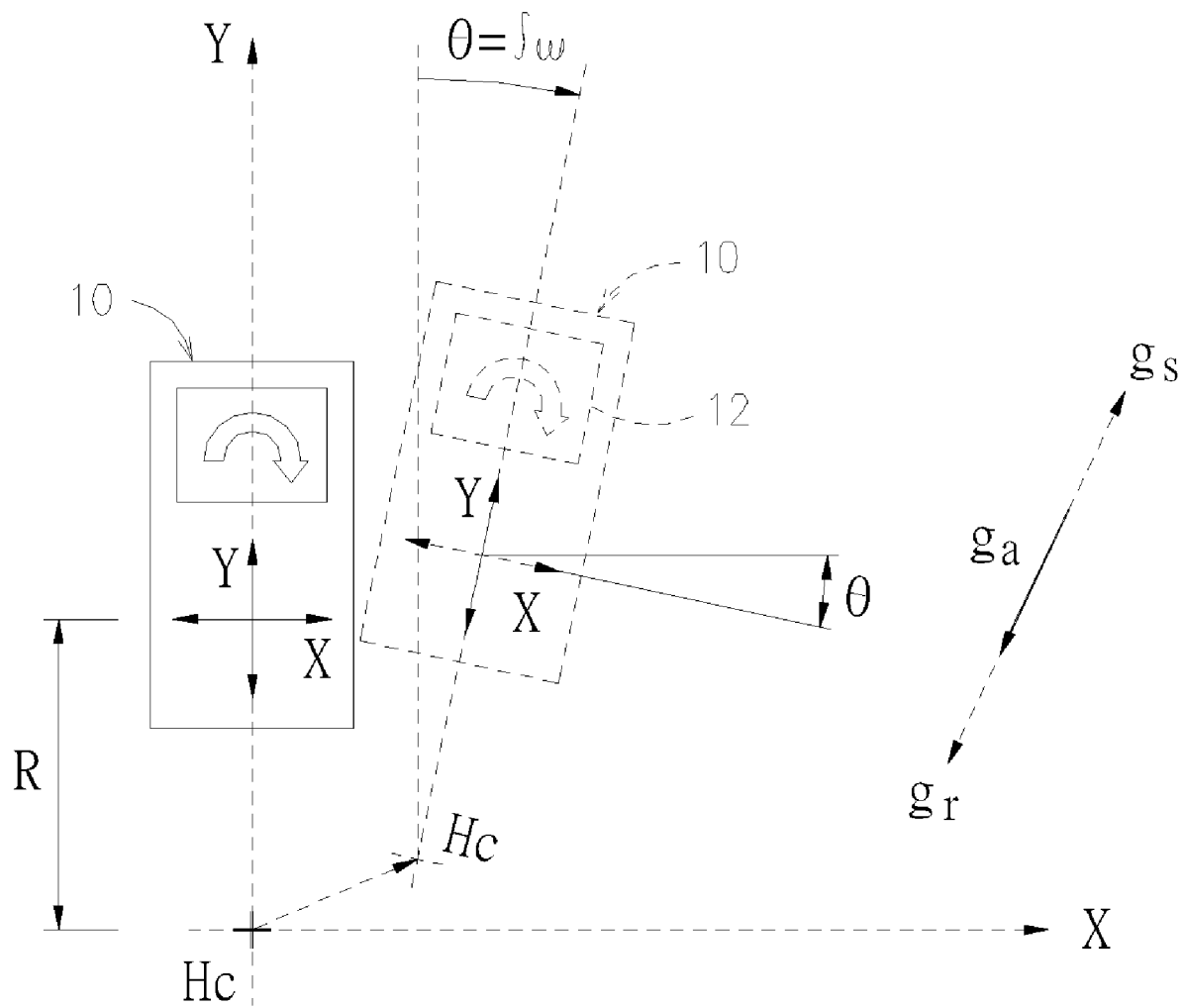
FIG. 8 is a schematic diagram showing forces exerting on a Y-axis accelerometer of the inertial input apparatus while the inertial input apparatus is rotating.

With the aforesaid inertial input apparatus with six-axial detection ability 10, an operating method for the inertial input apparatus 10 as it is being held to move in a free space can be provided. Please refer to FIG. 5 and FIG. 6, which illustrate an operating method for an inertial input apparatus with six-axial detection ability being held to move in a free space. The operating method 50 of FIG. 5 comprises the steps of:

Step 51: recording two accelerations ($g_{xs}$, $g_{ys}$) measured along two perpendicular directions with respect to a Cartesian coordinate system of X-, and Y-axes at an initial operating stage of the inertial input apparatus along with an initial angular velocity $\omega_{zs}$ of a gyroscope while setting an initial angle $\theta_p$ of the inertial input apparatus to be zero;

Step 52: calculating a yawing angle $\theta_z$ with respect to a Z-axis of the Cartesian coordinate system and a pitch angle $\theta_y$ with respect to the Y-axis; in a preferred aspect, as seen in FIG. 6, the step 52 further comprises the following steps:

Step 521: calculating the yawing angle $\theta_z$ with respect to the Z-axis by the following formulas:

$$\theta_z = \theta_p + (\omega_z - \omega_{zs}) \times \Delta t \qquad (1)$$

while $|\omega_z - \omega_{zs}|$ is larger than a threshold value,
wherein $\Delta t$ is the sampling interval, preferably every 10 mini-sec,
the threshold value is preferably being set to be 0.1 so as to eliminate noise correspondingly,
and then let $\theta_p = \theta_z$;

Step 522: compensating a Y-axis acceleration detected by a Y-axis accelerometer of an acceleration module by subtracting a centripetal force $g_r$ from an actual acceleration $g_a$ detected by the Y-axis accelerometer, as illustrated in the following formulas:

$$g_r = R \times (\omega_z - \omega_{zs})^2; \qquad (2\text{-}1)$$

$$g_a = g_r + g_s; \qquad (2\text{-}2)$$

$$g_y = g_a - g_r; \qquad (3)$$

wherein R is the distance between a rotation center and the accelerometer; as seen In FIG. 8 where Hc represent a center of rotation;
$g_s$ is acceleration caused by other electrical noises;
$g_y$ is the compensated Y-axis acceleration;
the compensation is based on a concept that when the inertial input apparatus 10 is rotating, the Y-axis accelerometer will be subjected to an additional centripetal force which can be measured by the use of the angular velocity detected by the gyroscope 12 and it radius of rotation. Thus, by subtracting a centripetal force $g_r$ from an actual acceleration $g_a$ detected by the Y-axis accelerometer, as seen in (2-2), an compensated Y-axis acceleration $g_y$ is obtained;

Step 523: calculating the pitch angle $\theta_y$ with respect to the Y-axis using the compensated Y-axis acceleration $g_y$ by the following formulas:

$$\theta_y = \sin^{-1}\left(\frac{g_y - g_{ys}}{g_{ys}}\right) \qquad (4)$$

It is noted that, by the detection of the gyroscope 12, an unconscious rotation of inertial input apparatus 10 as it is being held to move thereby can be compensated so that not only the inertial sensing input apparatus of the invention is freed from the shortcomings of prior-art inertial input apparatus using only accelerometer, but also it is a device that can be handle smoothly and naturally.

Step 53: using the two angles ($\theta_z$, $\theta_y$) to define a position coordinate ($M_x$, $M_y$) for an object displayed on a screen of an interactive computer; in which the two angles ($\theta_z$, $\theta_y$), obtained in step 521 and step 523, are amplified by specific ratios in respective so as to be used for defining a position coordinate ($M_x$, $M_y$) for an object displayed on a screen of an interactive computer, according to the following formulas:

$$M_x = S_x \times \theta_z, \; M_y = S_y \times \theta_y; \qquad (5)$$

wherein $S_x$ is the amplifying ratio with respect to the X-axis;
$S_y$ is the amplifying ratio with respect to the Y-axis;
It is noted that the specific ratios $S_x$, $S_y$ are adjustable.

Figure 7:
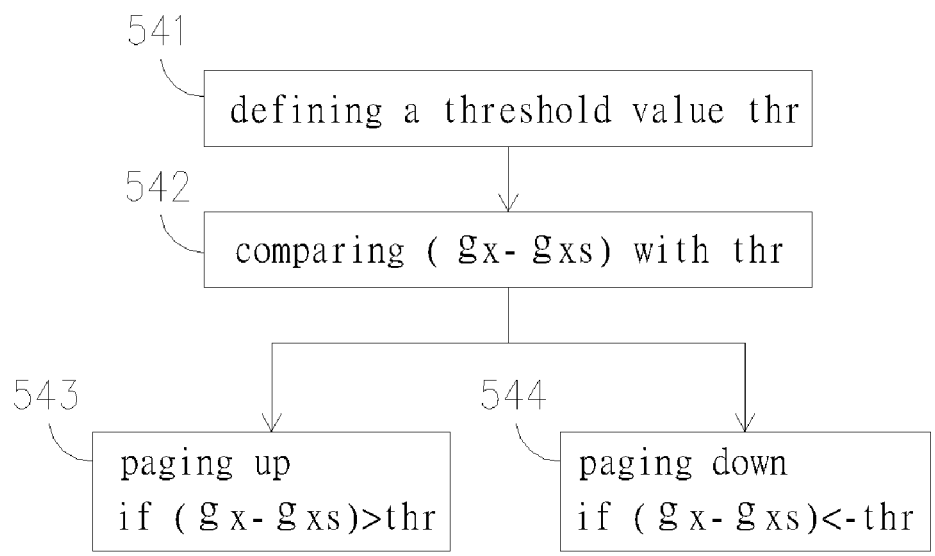
FIG. 7 is a flow chart depicting steps for page-change detection.

Step 54: performing a page-change detection, which use an abrupt change in X-axis acceleration detected by the inertial input apparatus as a page-change signal by comparing the abrupt change with a threshold value, as seen in FIG. 7, further comprising the steps of:

Step 541: defining a threshold value thr; whereas the threshold value thr is adjustable with respect to actual requirement, e.g. defining thr=150 (count);

Step 542: comparing ($g_x - g_{xs}$) with thr so as to use the comparison to determine whether to perform a page-up operation or a page-down operation, whereas $g_x$ is an X-axis acceleration at the end of an abrupt change occur, and $g_{xs}$ is an X-axis acceleration at the beginning of an abrupt change occur;

Step 543: paging up if ($g_x - g_{xs}$) > thr;
Step 544: paging down if ($g_x - g_{xs}$) < -thr;
It is noted that the condition of the aforesaid paging up and down can be reversed, as that paging down if ($g_x - g_{xs}$) > thr; and paging up if ($g_x - g_{xs}$) < -thr; moreover, if $-\text{thr} \leq (g_x - g_{xs}) \leq \text{thr}$, it is specified as an unconscious movement of a user and thus no page change will be performed.

In addition to the aforesaid page changing using abrupt acceleration change as page-change signal, a rolling angle $\theta_x$ with respect the Y-axis can be used as a page-change signal by comparing the rolling angle $\theta_x$ with a threshold value. Similarly, first, a threshold value thr is defined, e.g. defining thr=30°; and then the page-change detection step is structured as following:

paging up if $\theta_x$ > thr; and paging down if $\theta_x$ < -thr; or vice versa;
maintaining without page change if $-\text{thr} \leq \theta_x \leq \text{thr}$.

Figure 9:
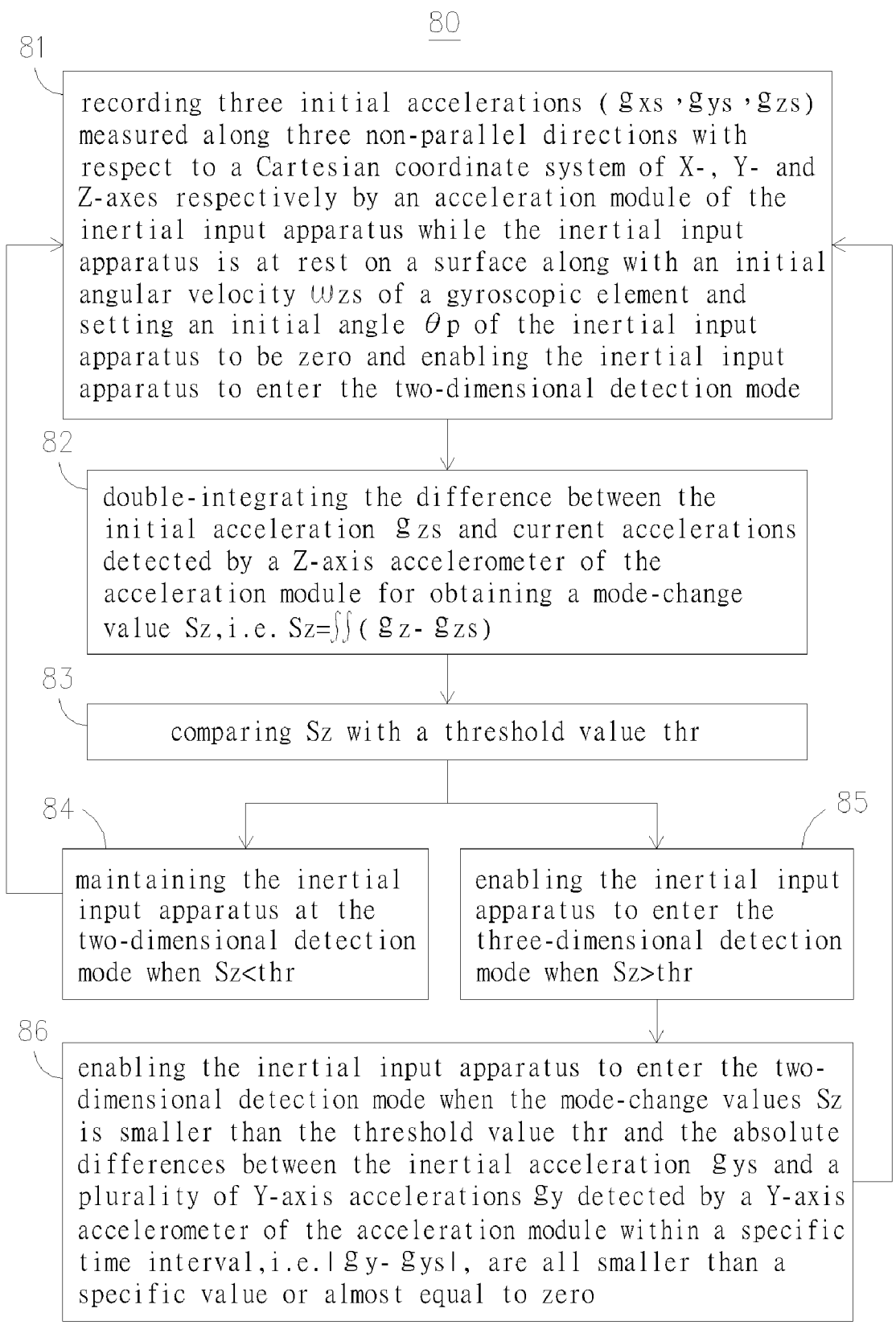
FIG. 9 is a flow chart depicting steps of switching an inertial input apparatus between a two-dimensional detection mode and a three-dimensional detection mode.

Moreover, referring to FIG. 9, the present invention further provide a method for switching an inertial input apparatus with six-axial detection ability between a two-dimensional detection mode and a three-dimensional detection mode, comprising the steps of:

Step 81: recording three initial accelerations ($g_{xs}$, $g_{ys}$, $g_{zs}$) measured along three perpendicular directions with respect to a Cartesian coordinate system of X-, Y- and Z-axes respectively by an acceleration module of the inertial input apparatus while the inertial input apparatus is at rest on a surface along with an initial angular velocity $\omega_{zs}$ of a gyroscope and setting an initial angle $\theta_p$ of the inertial input apparatus to be zero and enabling the inertial input apparatus to enter the two-dimensional detection mode;

Step 82: double-integrating the difference between the initial acceleration $g_{zs}$ and current accelerations detected by a Z-axis accelerometer of the acceleration module for obtaining a mode-change value $S_Z$, i.e. $S_Z = \iint(g_z - g_{zs})$;

Step 83: comparing $S_Z$ with a threshold value thr;

Step 84: maintaining the inertial input apparatus at the two-dimensional detection mode when $S_Z <$ thr; and Step 85: enabling the inertial input apparatus to enter the three-dimensional detection mode when $S_Z >$ thr, which indicates the inertial input apparatus has be lifted from the surface to be used as a pointing device, such as a presentation device, and thus the inertial input apparatus is enabled to enter its three-dimension detection mode for performing tasks, such as page changing as indicated in FIG. 5~FIG. 7; and Step 86: enabling the inertial input apparatus to enter the two-dimensional detection mode when the mode-change values $S_Z$ is smaller than the threshold value thr and the absolute differences between the inertial acceleration $g_{ys}$ and a plurality of Y-axis accelerations $g_y$ detected by a Y-axis accelerometer of the acceleration module within a specific time interval, i.e. $|g_y - g_{ys}|$, are all smaller than a specific value or almost equal to zero.

For further freeing the inertial input apparatus from errors caused by unconscious movements of a user holding the same, the inertial input apparatus can be set to enter the three-dimensional detection mode only when a plurality of mode-change values $S_Z$ detected within a specific time interval are all larger than the threshold value thr. Similarly, the inertial input apparatus is enabled to enter the two-dimensional detection mode when the mode-change values $S_Z$ is smaller than the threshold value thr and the absolute differences between the inertial acceleration $g_{ys}$ and a plurality of Y-axis accelerations $g_y$ detected by a Y-axis accelerometer of the acceleration module within a specific time interval, i.e. $|g_y - g_{ys}|$, are all smaller than a specific value or almost equal to zero.

To sum up, the present invention relates to an inertial input apparatus with six-axial detection ability, structured with a gyroscope and an acceleration module capable of detecting accelerations of X, Y, Z axes defined by a 3-D Cartesian coordinates, which is operable either being held to move on a planar surface or in a free space. When the inertial input apparatus is being held to move and operate on a planar surface by a user, a two-dimensional detection mode is adopted thereby that the gyroscope is used for detection rotations of the inertial input apparatus caused by unconscious rolling motions of the user and thus compensating the erroneous rotations, by which the technical disadvantages of prior-art inertial input apparatuses equipped with only accelerometer can be overcame and thus control smoothness of using the input apparatus is enhanced. In addition, when the inertial input apparatus is being held to move and operate in a free space by a user, a three-dimensional detection mode is adopted for enabling the inertial input apparatus to detect movements of the same with respect to at most six axes defined by the 3-D Cartesian coordinates of X, Y, Z axes, that is, the rotations with respect to the X, Y, Z axes and the movements with respect to the X, Y, Z axes, and thus the inertial input apparatus is adapted to be used as an input device for interactive computer games, In a preferred aspect, when the inertial input apparatus is acting as a 3-D mouse suitable to be used for briefing or in a remote control environment, only the detections with respect to the X and Y axes acquired by the accelerometer along with that of the gyroscope are adopts and used as control signals for controlling cursor displayed on a screen, but the detection with respect to the Z-axis acquired by the accelerometer is used as a switch signal for directing the inertial input apparatus to switch between its two-dimensional detection mode and three-dimensional detection mode.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for switching an inertial input apparatus with six-axial detection ability between a two-dimensional detection mode and a three-dimensional detection mode, comprising the steps of:

recording three initial accelerations ($g_{xs}$, $g_{ys}$, $g_{zs}$) measured along three perpendicular directions with respect to a Cartesian coordinate system of X-, Y- and Z-axes respectively by an acceleration module of the inertial input apparatus while the inertial input apparatus is at rest on a planar surface along with an initial angular velocity $\omega_{zs}$ gyroscope and setting an initial angle $\theta_p$ of the inertial input apparatus to be zero and enabling the inertial input apparatus to enter the two-dimensional detection mode;

double-integrating the difference between the initial acceleration $g_{zs}$ and current accelerations detected by a Z-axis accelerometer of the acceleration module for obtaining a mode-change value $S_z$, i.e. $S_z = \iint(g_z - g_{zs})$;

comparing $S_z$ with a threshold value thr;

maintaining the inertial input apparatus at the two-dimensional detection mode when $S_z <$ thr; and enabling the inertial input apparatus to enter the three-dimensional detection mode when $S_z >$ thr.

2. The method of claim 1, wherein the inertial input apparatus is enabled to enter the three-dimensional detection mode when a plurality of mode-change values $S_z$ detected within a specific time interval are all larger than the threshold value thr.

3. The method of claim 1, wherein the inertial input apparatus is enabled to enter the two-dimensional detection mode when the mode-change values $S_z$ is smaller than the threshold value thr and the absolute differences between the inertial acceleration $g_{ys}$ and a plurality of Y-axis accelerations $g_Y$ detected by a Y axis accelerometer of the acceleration module within a specific time interval, i.e. $|g_y - g_{ys}|$, are all smaller than a specific value or almost equal to zero.

4. An operating method for an inertial input apparatus with six-axial detection ability being held to move in a free space, comprising the steps of:

recording two accelerations ($g_{xs}$, $g_{ys}$) measured along two perpendicular directions with respect to a Cartesian coordinate system of X-, and Y-axes at an initial operating stage of the inertial input apparatus along with an initial angular velocity $\omega_{zs}$ of a gyroscope while setting an initial angle $\theta_p$ of the inertial input apparatus to be zero;

calculating a yawing angle $\theta_z$ with respect to a Z-axis of the Cartesian coordinate system and a pitch angle $\theta_y$ with respect to the Y-axis, further comprises the steps of:

calculating the yawing angle $\theta_z$ with respect to the Z-axis;

compensating a Y-axis acceleration detected by a Y-axis accelerometer of an acceleration module; and calculating the pitch angle $\theta_y$; and using two angles ($\theta_z$, $\theta_y$) to define a position coordinate ($M_x$, $M_y$) for an object displayed on a screen of an interactive computer; and detecting a page-change, comprising the steps of:

defining a threshold value thr;

calculating a rolling angle $\theta_x$ with respect the Y-axis; and comparing the rolling angle $\theta_x$ with thr so as to use the comparison to determine whether to perform a page-up operation or a page-down operation.

5. The method of claim 4, wherein the step of calculating the yawing angle $\theta_z$ with respect to the Z-axis is performed by the following formulas:

$\theta_z = \theta_p + (\omega_z - \omega_{zs}) \times \Delta t$, while $|\omega_z - \omega_{zs}|$ is larger than a threshold value, wherein $\Delta t$ is the sampling interval, preferably every 10 mini-sec, the threshold value is preferably being set to be 0.1 so as to eliminate noise correspondingly, and then let $\theta_p = \theta_z$.

6. The method of claim 4, wherein the step of compensating a Y-axis acceleration detected by a Y-axis accelerometer of an acceleration module is perform by subtracting a centripetal force $g_r$ from an actual acceleration $g_a$ detected by the Y-axis accelerometer, as illustrated in the following formulas:

$g_a = g_r + g_s$;

$g_r = R \times (\omega_{z-\omega zs})^2$;

$g_y = g_a - g_r$;

wherein R is the distance between a rotation center and the accelerometer;

$g_s$ is acceleration caused by other electrical noises;

$g_y$ is the compensated Y-axis acceleration.

7. The method of claim 4, wherein the step of calculating the pitch angle $\theta_y$ with respect to the Y-axis using the compensated Y-axis acceleration $g_y$ is performed by the following formulas:

$$\theta_y = \sin^{-1}\left(\frac{g_y - g_{ys}}{g_{ys}}\right).$$

8. An operating method for an inertial input apparatus with six-axial detection ability being held to move in a free space, comprising the steps of:

recording two accelerations ($g_{xs}$, $g_{ys}$) measured along two perpendicular directions with respect to a Cartesian coordinate system of X-, and Y-axes at an initial operating stage of the inertial input apparatus along with an initial angular velocity $\omega_{zs}$ of a gyroscope while setting an initial angle $\theta_p$ of the inertial input apparatus to be zero;

calculating a yawing angle $\theta_z$ with respect to a Z-axis of the Cartesian coordinate system and a pitch angle $\theta_y$ with respect to the Y-axis; and using two angles ($\theta_z$, $\theta_y$) to define a position coordinate ($M_x$, $M_y$) for an object displayed on a screen of an interactive computer;

wherein the two angles ($\theta_z$, $\theta_y$) are amplified by specific ratios $S_x$, $S_y$ in respective so as to be used for defining a position coordinate ($M_x$, $M_y$) for an object displayed on a screen of an interactive computer, according to the following formulas:

$M_s = S_x \times \theta_z, M_y = S_y \times \theta_y,$ wherein $S_x$ is the amplifying ratio with respect to the X-axis, and $S_y$ is the amplifying ratio with respect to the Y-axis.

9. The method of claim 8, wherein the specific ratios $S_x$, $S_y$ are adjustable.

10. The method of claim 4, detecting the page-change, further comprising the steps of:

comparing ($g_x - g_{xs}$) with thr so as to use the comparison to determine whether to perform a page-up operation or a page-down operation, whereas $g_x$ is an X-axis acceleration at the end of an abrupt change occur, and $g_{xs}$ is an X-axis acceleration at the beginning of an abrupt change occur.

11. The method of claim 10, wherein the page-change detection step further comprises the steps of:

paging up if ($g_x - g_{xs}$)>thr; and paging down if ($g_x - g_{xs}$)<-thr.

12. The method of claim 11, further comprising the step of:

maintaining without page change if $-thr \leq (g_x - g_{xs}) \leq thr$.

13. The method of claim 10, wherein the page-change detection step further comprises the steps of:

paging down if ($g_x - g_{xs}$)>thr; and paging up if ($g_{x-gxs}$)<-thr.

14. The method of claim 13, wherein further comprising the step of:

maintaining without page change if $-thr \leq (g_x - g_{xs}) \leq thr$.

15. The method of claim 10, wherein the threshold value thr is adjustable according to actual requirement.

16. The method of claim 4, wherein the page-change detection step further comprises the steps of:

paging down if θhd x>thr; and paging up if $\theta_x$<-thr.

17. The method of claim 16, wherein further comprising the step of:

maintaining without page change if $-thr \leq \theta_x \leq thr$.

18. The method of claim 4, wherein the page-change detection step further comprises the steps of:

paging up if $\theta_x$>thr; and paging down if $\theta_x$<-thr.

19. The method of claim 18, wherein further comprising the step of:

maintaining without page change if $-thr \leq$ θhd x $\leq thr$.

* * * * *